US010459189B2

(12) United States Patent
Chang et al.

(10) Patent No.: US 10,459,189 B2
(45) Date of Patent: Oct. 29, 2019

(54) LENS BARREL, LENS-BARREL WAFER, AND ASSOCIATED METHOD

(71) Applicant: OmniVision Technologies, Inc., Santa Clara, CA (US)

(72) Inventors: Chia-Yang Chang, Sunnyvale, CA (US); Teng-Sheng Chen, Hsinchu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 355 days.

(21) Appl. No.: 15/286,300

(22) Filed: Oct. 5, 2016

(65) Prior Publication Data

US 2018/0095235 A1  Apr. 5, 2018

(51) Int. Cl.
G02B 7/02 (2006.01)
G02B 5/00 (2006.01)
G02B 13/00 (2006.01)

(52) U.S. Cl.
CPC ............ *G02B 7/021* (2013.01); *G02B 5/005* (2013.01); *G02B 13/0085* (2013.01)

(58) Field of Classification Search
USPC .................. 359/738, 739, 740, 808, 811–830
See application file for complete search history.

(56) References Cited

U.S. PATENT DOCUMENTS 8,013,289 B2   9/2011  Chang et al.
8,092,102 B2   1/2012  Shangguan et al.
8,114,701 B2   2/2012  Kwon et al.
2008/0158698 A1  7/2008  Chang et al.
2011/0037886 A1  2/2011  Singh et al.
2011/0037887 A1*  2/2011  Lee .................... G02B 13/0035
                                                      348/340
2013/0122261 A1  5/2013  Barnes et al.
2013/0267273 A1  10/2013  Rudmann et al.
(Continued)

FOREIGN PATENT DOCUMENTS

CN    102299162 A    12/2011
CN    104247020 A    12/2014

OTHER PUBLICATIONS

Taiwan Patent Application No. 106134259 English translation of Office Action dated Aug. 3, 2018, 6 pages.
(Continued)

*Primary Examiner* — William R Alexander
*Assistant Examiner* — Gary W O'Neill
(74) *Attorney, Agent, or Firm* — Lathrop Gage LLP

(57) ABSTRACT

A method for forming a lens barrel includes aligning each of a plurality of upper apertures of an upper wafer to (i) a respective one of a plurality of middle apertures of a middle wafer and (ii) a respective one of a plurality of lower apertures of a lower wafer. The middle wafer is between the upper wafer and the lower wafer. The method also includes bonding the middle wafer to the upper wafer to form a lens barrel wafer. Each triad of co-aligned upper, middle, and lower apertures forms a wafer aperture spanning between a top surface of the upper wafer and a bottom surface of the lower wafer. Each upper aperture has a respective upper width and each middle aperture has a respective middle width less than the respective upper width to form, in each triad, a ledge for supporting a lens in the upper aperture.

16 Claims, 10 Drawing Sheets

(56) References Cited

U.S. PATENT DOCUMENTS

2013/0308212 A1* 11/2013 Kubala ................ G02B 13/146
　　　　　　　　　　　　　　　　　　　　　　　359/819
2015/0358510 A1　　12/2015　Wan et al.
2015/0362705 A1　　12/2015　Nabighian et al.

OTHER PUBLICATIONS

Schwertz, K and Burge, J; Field Guide to Optomechanical Design and Analysis; https://spie.org/samples/FG26.pdf; Aug. 2012; pp. 57-61.

* cited by examiner

LENS BARREL, LENS-BARREL WAFER, AND ASSOCIATED METHOD

BACKGROUND

Many high-volume consumer products such as mobile devices and motor vehicles now include a digital camera. For example, FIG. 1 shows a mobile device 190 having a camera module 180 integrated therein. Camera module 180 includes an image sensor 102 beneath an imaging lens 170.

FIG. 2 is a cross-sectional view of a prior-art camera module 280, which is an example of camera module 180. Camera module 280 includes a lens barrel 200 bonded to image sensor 102, which includes a pixel array 104. Lens barrel 200 includes a cover glass 202, a lower spacer 204, a lens 270, an upper spacer 206, and a top cover glass 208. Lens 270 includes lens substrate 272, a bottom lens 274 and a top lens 276. Substrate 272 has a width 272W which equals a width 102W of image sensor 102.

Spacer 204 is typically formed of glass or plastic. Forming spacer 204 from glass is expensive, while a spacer 204 formed of plastic does not bond well with glass, e.g., of cover glass 202 or substrate 272, because of mismatched thermal expansion coefficients. Lens barrel 200 may include an opaque coating 271, located on the sensor-facing surface of substrate 272, for example, to prevent stray light from reaching image sensor 102.

SUMMARY OF THE INVENTION

In a first embodiment, a lens barrel includes an annular lower layer, an annular upper layer, and an annular middle layer. The annular lower layer defines a lower aperture therethrough. The annular upper layer defines an upper aperture therethrough having an upper width. The annular middle layer is bonded between the lower layer and the upper layer and defines a middle aperture having a middle width that is less than the upper width to form a ledge for supporting a lens disposed in the upper aperture. The lower aperture, the middle aperture, and the upper aperture collectively form at least part of a barrel aperture through the lower, middle, and upper layers.

In a second embodiment, a lens-barrel wafer includes a lower wafer, a middle wafer, and an upper wafer. The lower wafer includes a plurality of lower apertures each having a respective lower width and spanning between a bottom surface and a top surface of the lower wafer. The upper wafer includes a plurality of upper apertures each spanning between a bottom surface and a top surface of the upper wafer. The middle wafer is bonded between the top surface of the lower wafer and the bottom surface of the upper wafer. The middle wafer includes a plurality of middle apertures each aligned with a respective one of the plurality of lower apertures and a respective one of the plurality of upper apertures. Each middle aperture, a lower aperture aligned thereto, and an upper aperture aligned thereto forms a wafer aperture spanning between the bottom surface of the lower wafer and the top surface of the upper wafer. Each middle aperture has a width less than the respective width of the upper aperture aligned thereto, to form a ledge for supporting a lens placed in the upper aperture aligned thereto.

In a third embodiment, a method for forming a lens barrel includes an aligning step and a bonding step. In the aligning step, the method aligns each of a plurality of upper apertures of an upper wafer to (i) a respective one of a plurality of middle apertures of a middle wafer and (ii) a respective one of a plurality of lower apertures of a lower wafer. The middle wafer is between the upper wafer and the lower wafer. In the bonding step, the method bonds the middle wafer to the upper wafer to form a lens barrel wafer. Each triad of co-aligned upper, middle, and lower apertures forms a wafer aperture spanning between a top surface of the upper wafer and a bottom surface of the lower wafer. Each of the upper apertures has a respective upper width and each of the middle apertures has a respective middle width that is less than the respective upper width to form, in each triad, a ledge for supporting a lens in the upper aperture.

DETAILED DESCRIPTION OF THE EMBODIMENTS

Figure 3A:
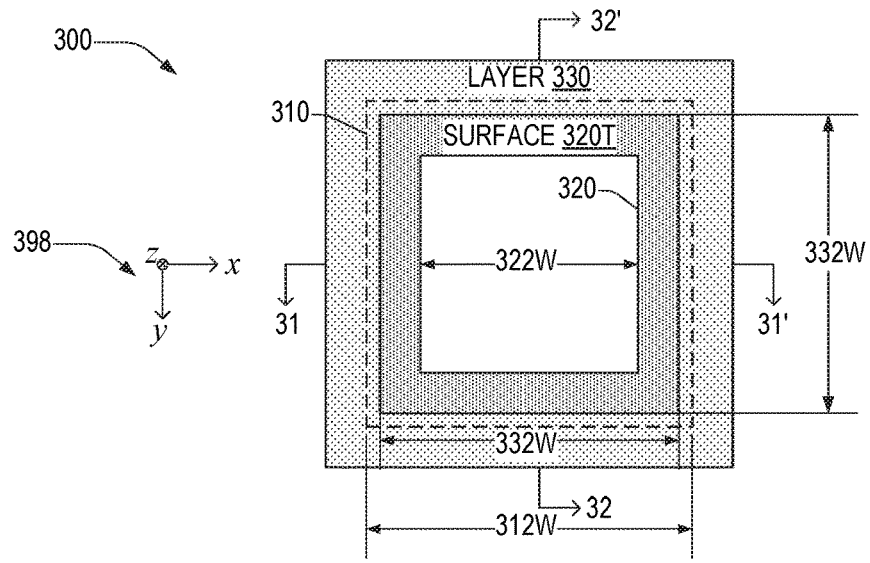
FIG. 3A is a top plan view and FIG. 3B is a cross-sectional view of a lens barrel, in an embodiment.
Figure 3B:
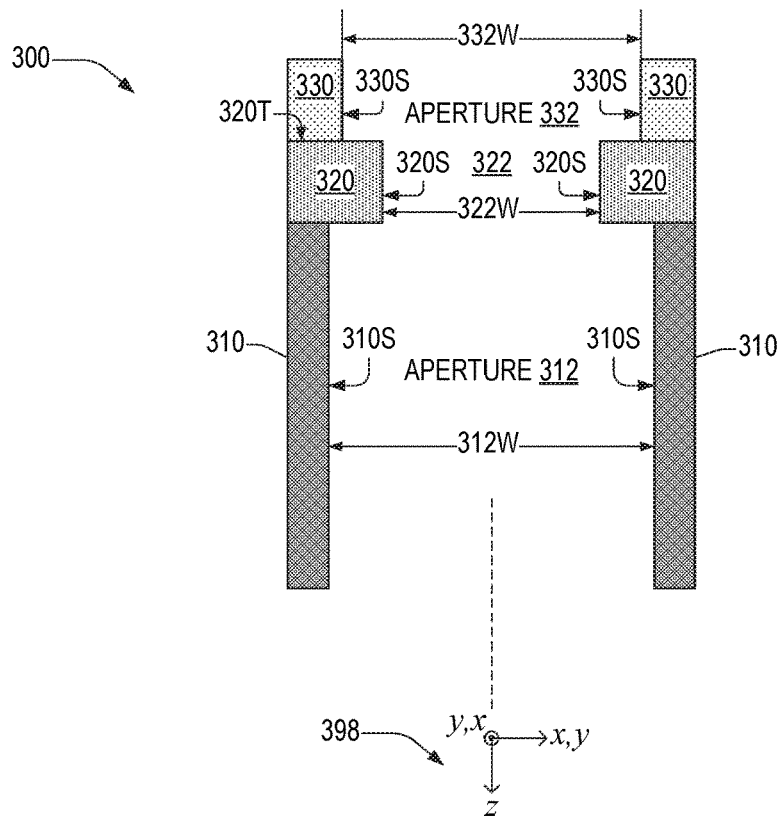

FIG. 3A is a top plan view and FIG. 3B is a cross-sectional view of a lens barrel 300. FIG. 3A includes cross-sectional planes 31-31' and 32-32', which are parallel to the x-z plane and y-z planes, respectively, of coordinate system 398. Herein, references to coordinates axes x, y, and z and planes formed thereof are to coordinate system 398, unless specified otherwise. The plan view of FIG. 3A is parallel to the x-y plane. The cross-sectional view of FIG. 3B represents lens barrel 300 in either or both of cross-sectional planes 31-31' and 32-32'.

Lens barrel 300 includes a lower layer 310, a middle layer 320, and an upper layer 330. Layers 310, 320, and 330 have respective inner sidewalls 310S, 320S, and 330S. Layers 310, 320, and 330 have respective apertures 312, 322, and 332 bounded by respective inner sidewalls 310S, 320S, and 330S and having respective widths 312W, 322W, and 332W. Middle layer 320 has a top surface 320T, part of which is visible in FIG. 3A through aperture 332. Width 332W exceeds width 322W. In an embodiment, at least two of layers 310 and 320 and 330 are monolithic, that is, they are formed from a single piece of material.

Figure 4A:
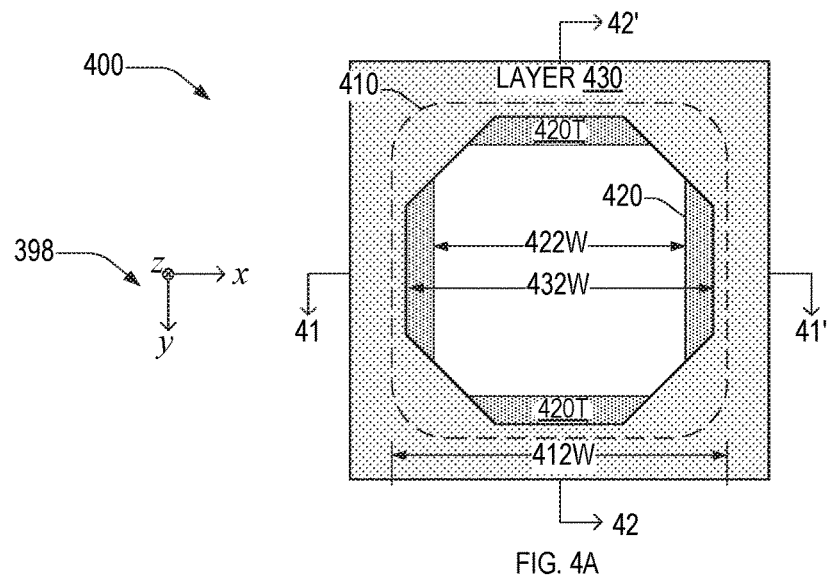
FIG. 4A is a plan view and FIG. 4B is a cross-sectional view of a lens barrel, which is an example of the lens barrel of FIG. 3.
Figure 4B:
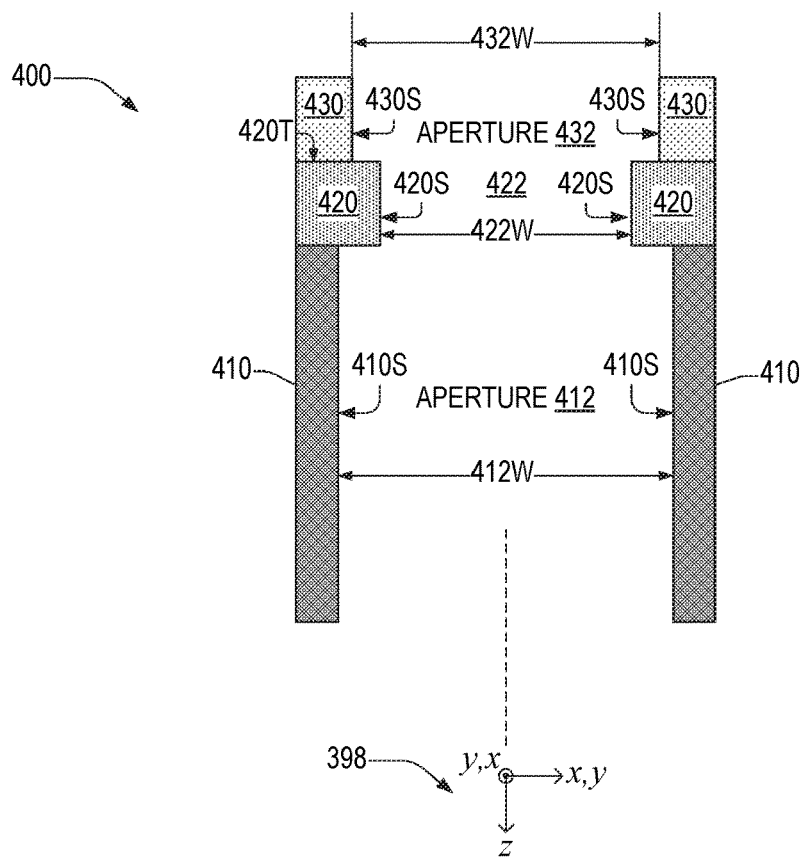

Apertures 312, 322, and 332 are shown a square in FIG. 3A, but may be other shapes, such as rectangular, polygonal, elliptical, or circular, without departing from the scope hereof. For example, FIG. 4A is a plan view and FIG. 4B is a cross-sectional view of a lens barrel 400. FIG. 4A includes cross-sectional planes 41-41' and 42-42', which are parallel to the x-z plane and y-z planes, respectively. The plan view of FIG. 4A is parallel to the x-y plane. The cross-sectional view of FIG. 4B represents lens barrel 400 in either or both of cross-sectional planes 41-41' and 42-42'.

Lens barrel 400 is an example of lens barrel 300. Lens barrel 400 includes a lower layer 410, a middle layer 420, and an upper layer 430, which are examples of a lower layer 310, middle layer 320, and upper layer 330, respectively. Layers 410, 420, and 430 have respective apertures 412, 422, and 432 bounded by respective inner sidewalls 410S, 420S, and 430S and having respective widths 412W, 422W, and 432W. Width 432W exceeds width 422W. Middle layer 420 has a top surface 420T, part of which is visible in FIG. 4A through aperture 432.

Figure 5A:
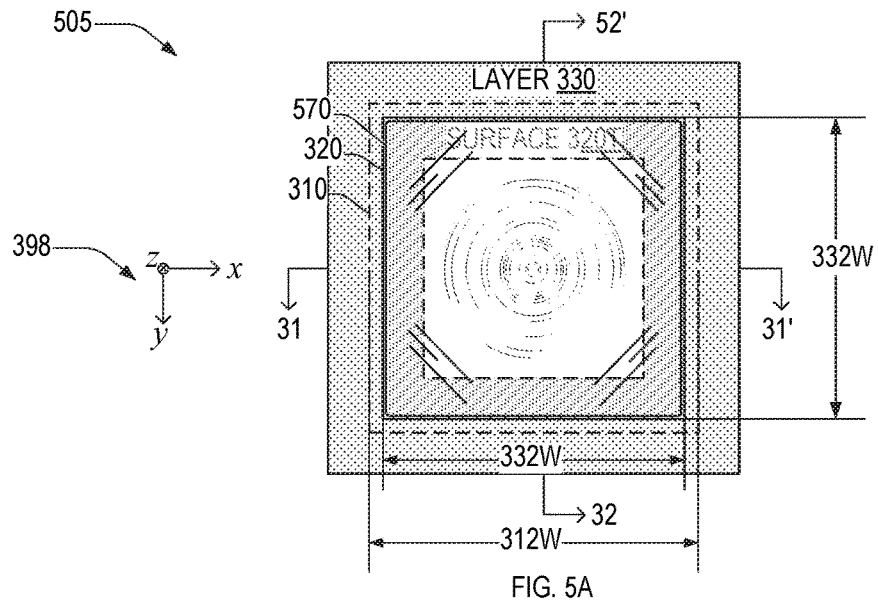
FIGS. 5A and 5B show a plan view and a cross-sectional view, respectively, of the lens barrel 300 of FIG. 3 with a lens bonded therein, in an embodiment.
Figure 5B:
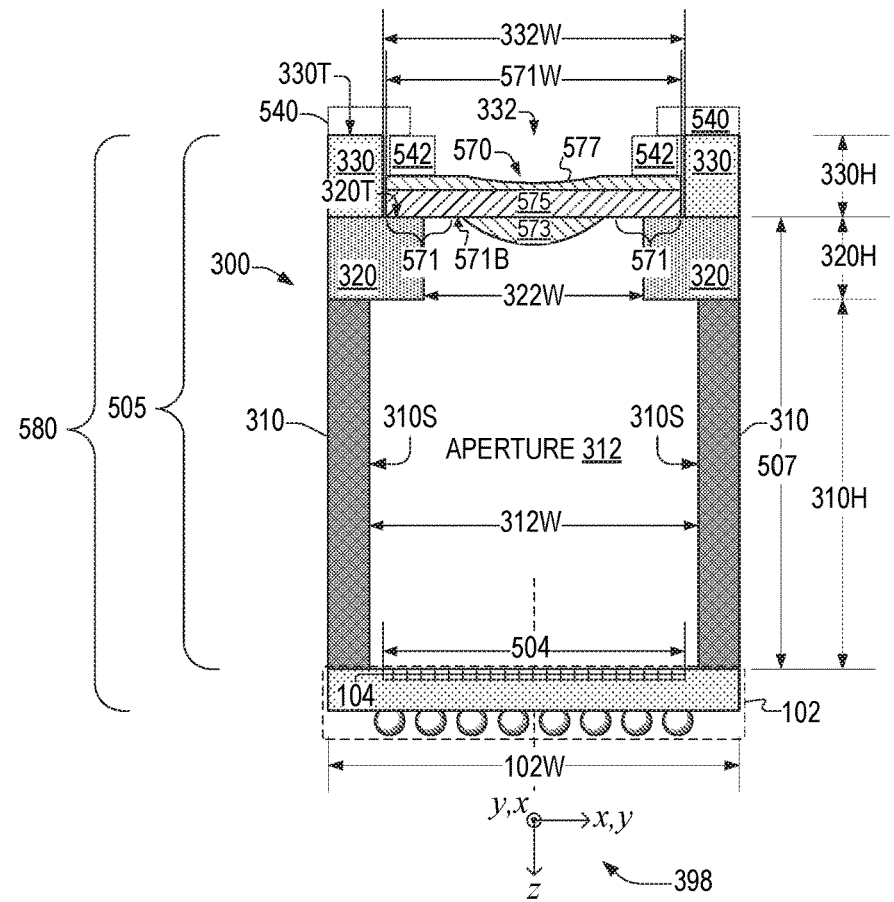

Lens barrel 300 may include a lens bonded therein. For example, FIGS. 5A and 5B show a plan view and a cross-sectional view, respectively, of a lens barrel 300 with a lens 570 bonded therein, which together form a barreled lens 505. Lens 570 for example includes a substrate 575 between a bottom lens 573 and a top lens 577. Top lens 577 may be formed via a puddle-dispense molding process or other processes known in the art. Lens 570 may include more or fewer than three optical elements without departing from the scope hereof. For example, lens 570 may be a singlet lens or a doublet lens.

Bottom lens 573 has width less than width 322W. Substrate 575 has a width less than width 332W. Lens 570 has a flange width 571W, which exceeds width 322W, and a flange region 571 having a bonding surface 571B. Unlike substrate width 272W of lens 270, flange width 571W may be less than image sensor width 102W, which enables more lenses 570 to be formed on a single wafer than the number of lenses 270 that can be formed on the same wafer.

In barreled lens 505, lens 570 may be bonded to top surface 320T of middle layer 320 at surface 571B. Bonding surface 571B may be a surface of substrate 575, as shown in FIG. 5B. Alternatively, bonding surface 571B may be a surface of top lens 577, in which case (a) substrate 575 has a width less than width 312W and (b) both substrate 575 and bottom lens 573 are at least partially within aperture 322 of middle layer 320.

In an embodiment, barreled lens 505 includes a cap layer 540 attached to a top surface 330T of top of layer 330 and a layer 542 spanning the region between layer 540 and top lens 577. Layers 540 and 542 may be a monolithic piece. Layer 542 may be transparent and span aperture 332 above lens 570. Layers 540 and 542 secure top lens 577 within aperture 332.

Figure 1:
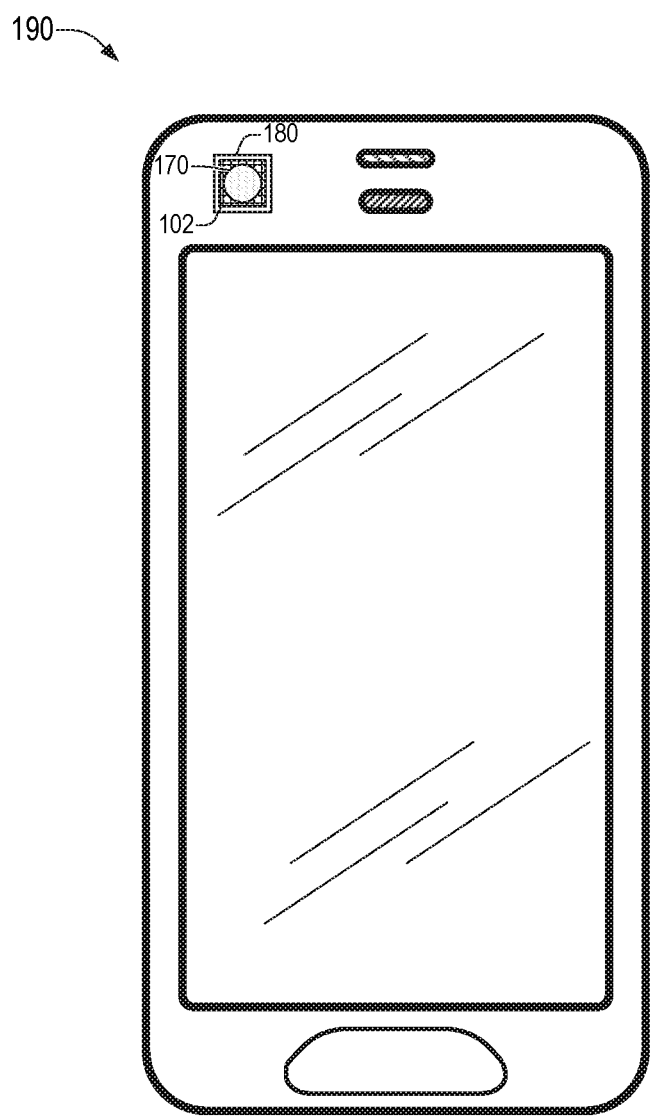
FIG. 1 shows a prior art mobile device having a camera module integrated therein.
Figure 2:
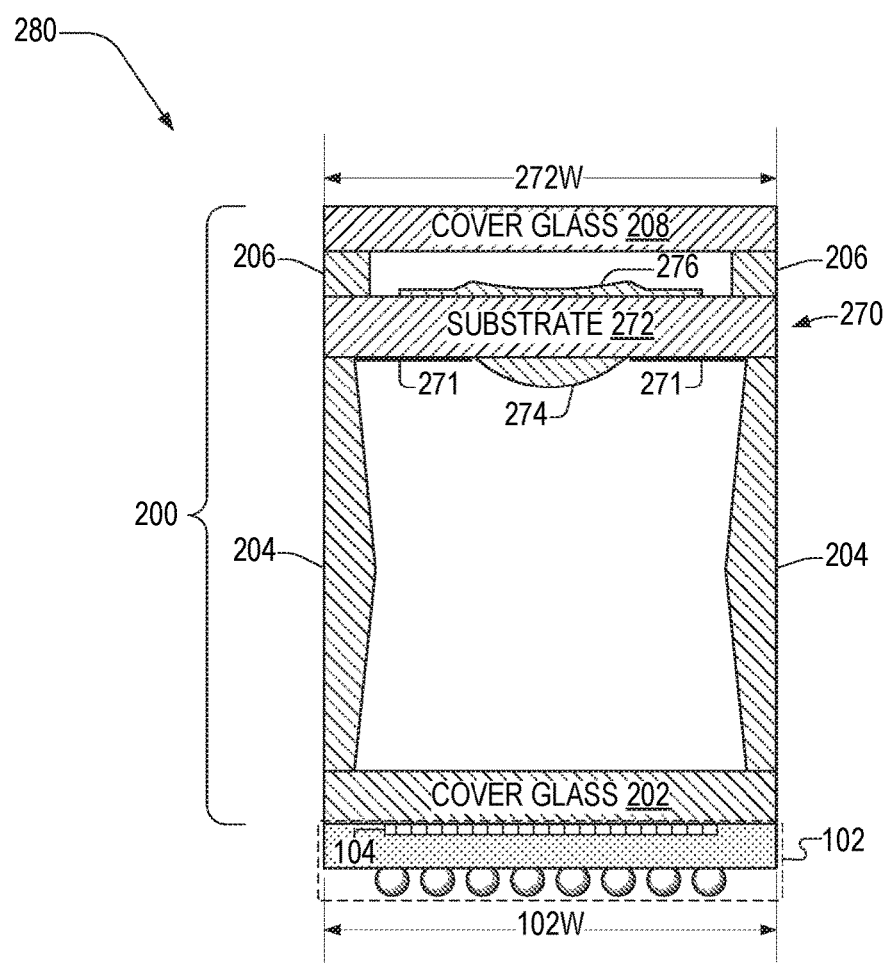
FIG. 2 is a cross-sectional view of a prior-art camera module, which is an example of the camera module of FIG. 1.

Lens barrel 300 may be bonded to image sensor 102, such that the combination of lens barrel 300, with lens 570 bonded therein, forms a camera module 580. Pixel array 104 of image sensor 102 has a diagonal 504. Width 312W is illustrated a exceeding both widths 322W and 332W, which enables lens barrel 300 to accommodate pixel arrays with a larger diagonal 504 than if width 312W did not exceed at least one of widths 322W and 332W. In an example of camera module 580, lens barrel 300 is for example bonded directly to image sensor 102, such that, unlike prior-art camera module 280 (FIG. 2), there is no coverglass between image sensor 102 and lens barrel 300.

In barreled lens 505, surface 571B of lens 570 and pixel array 104 are separated by a distance 507. Layers 310, 320, and 330 have respective heights 310H, 320H, and 330H. In a process for manufacturing lens barrel 300, precise determination of distance 507 to within a tolerance Δz may ensure that lens 570 forms an in-focus image on pixel array 104. In a first embodiment of lens barrel 300, layer 330 is separate from layer 320 and layers 310 and 320 are either separate or monolithic. In the first embodiment, distance 507 is at least partially determined by heights 310H and 320H. In a second embodiment of lens barrel 300, layers 320 and 330 are monolithic, and distance 507 is partially determined by thickness 330H, which in this case is not a layer thickness, but a depth of a hole extending from top surface 330T. Controlling thickness of a layer to within tolerance Δz is less costly then controlling thickness of a depth of a hole to within tolerance Δz. Accordingly, at least in terms of satisfying tolerance Δz for image quality purposes, the first embodiment has an advantage over the second embodiment.

Figure 6A:
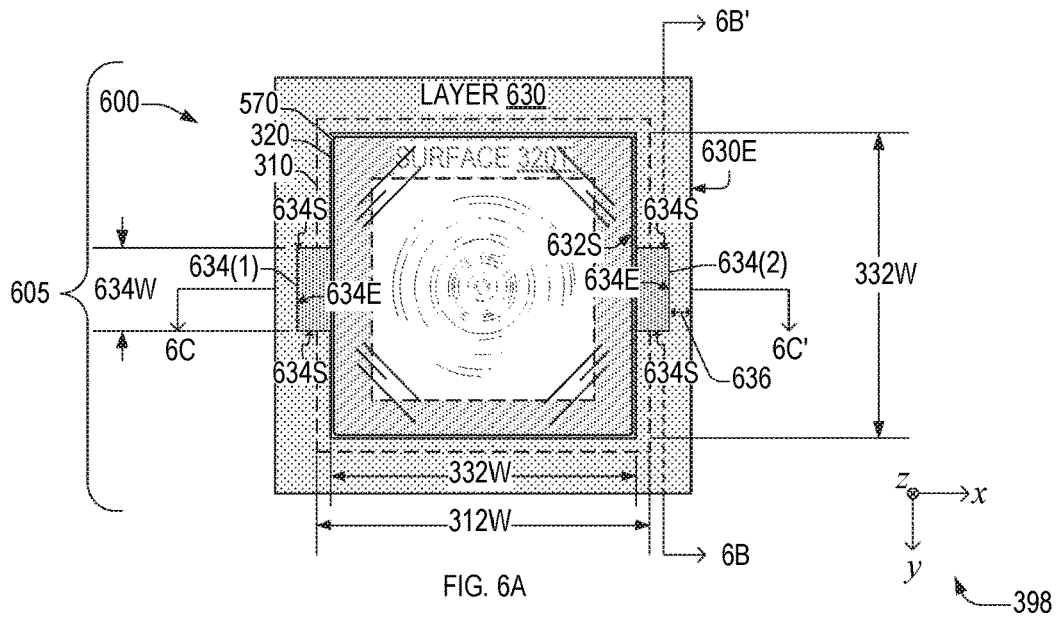
FIG. 6A is a plan view and FIGS. 6B and 6C are cross-sectional views of a lens barrel with lens therein, in an embodiment.
Figure 6B:
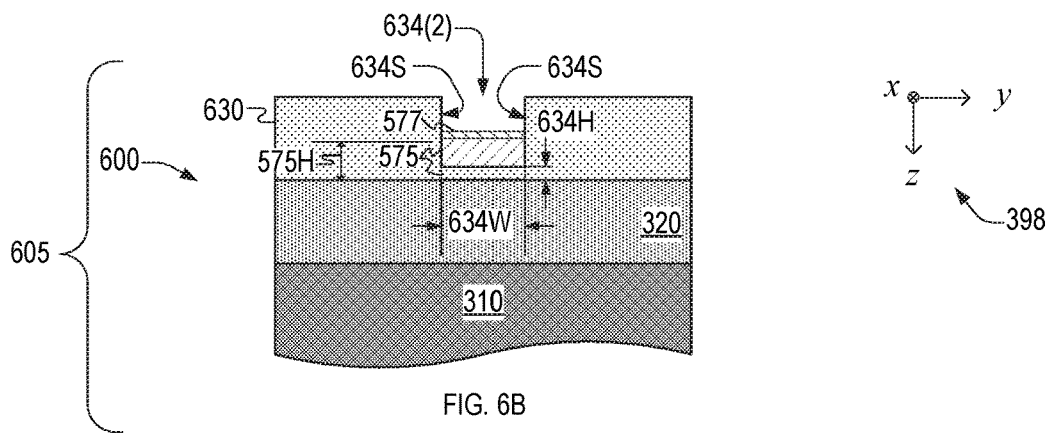
Figure 6C:
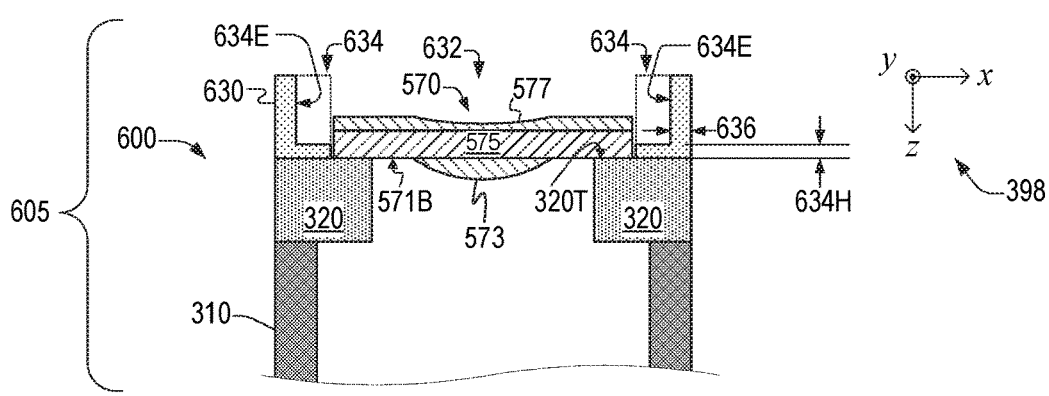

FIG. 6A a plan view of part of a lens barrel 600 with lens 570 therein, which together form a barreled lens 605. FIGS. 6B and 6C are cross-sectional views of part of barreled lens 605 along cross-sectional planes 6B-6B' and 6C-6C', respectively, of FIG. 6A. Cross-sectional planes 6B-6B' and 6C-6C' are parallel to the y-z plane and the x-z plane, respectively. Lens barrel 600 is an example of lens barrel 300 and includes an upper layer 630 on middle layer 320. Upper layer 630 is an example of upper layer 330, has an outer edge 630E, and an aperture 632, which has an aperture sidewall 632S.

Upper layer 630 has one or more notches 634 that expose a portion of lens 570. Notch 634 has a width 634W and sidewalls 634S, as illustrated in both FIGS. 6A and 6B. Within notch 634, upper layer 630 has a height 634H that is, for example, less than a height 575H of substrate 575, as shown in FIG. 6B. In FIG. 6C, dotted lines adjacent to upper layer 630 denote portions thereof removed. While substrate 575 and top lens 577 do not intersect cross-sectional plane 6B-6B', they are illustrated in FIG. 6B for illustrative purposes.

Lens 570 may be bonded to top surface 320T by dispensing a liquid adhesive into one or more notches 634 such that it flows between surfaces 320T and 571B, which are shown in FIG. 6C.

Notch 634 extends from aperture sidewall 632S such that its outer edge 634E is a distance 636 from outer edge 630E of layer 630. Distance 636 may equal zero such that a cross-sectional plane parallel to cross-sectional plane 6B-6B' that includes outer edge 630E also includes notch 634. Whereas upper layer 630 has two notches 634(1,2) in the example of FIG. 6, upper layer 630 may have fewer or more than two notches extending from aperture sidewall 632S without departing from the scope hereof. Upper layer 630 may have a single continuous notch surrounding its aperture 632.

Figure 7:
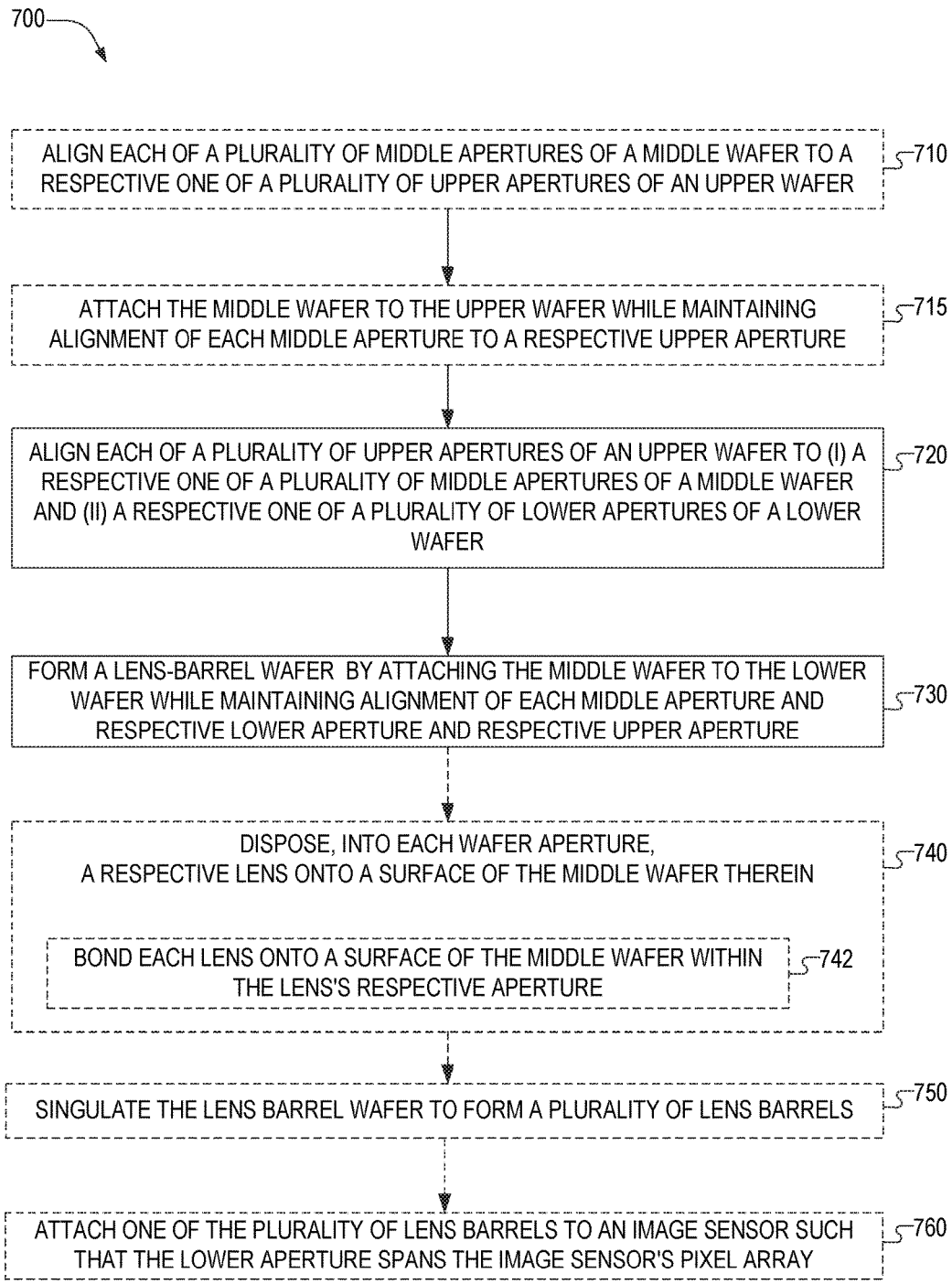
FIG. 7 is a flowchart illustrating an exemplary method for fabricating for forming the lens barrel of FIG. 3.
Figure 9A:
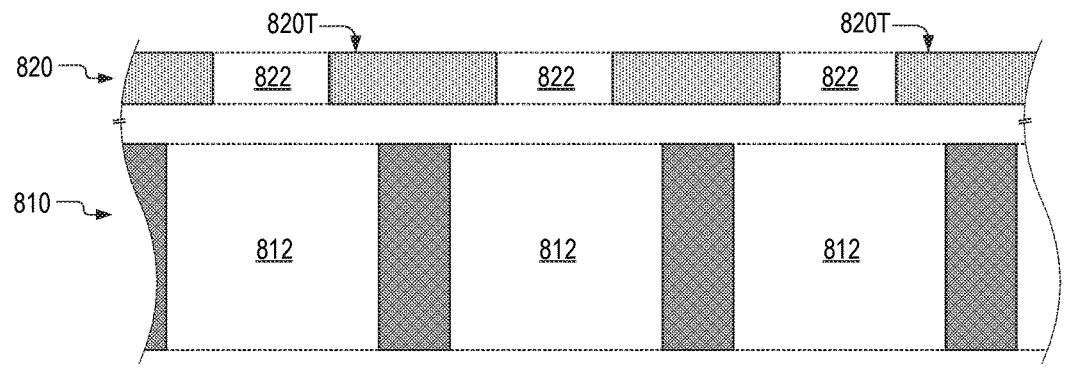
FIGS. 9A-9D are a cross-sectional views of the wafers of FIG. 8 illustrating steps of the method of FIG. 7, in an embodiment.
Figure 9B:
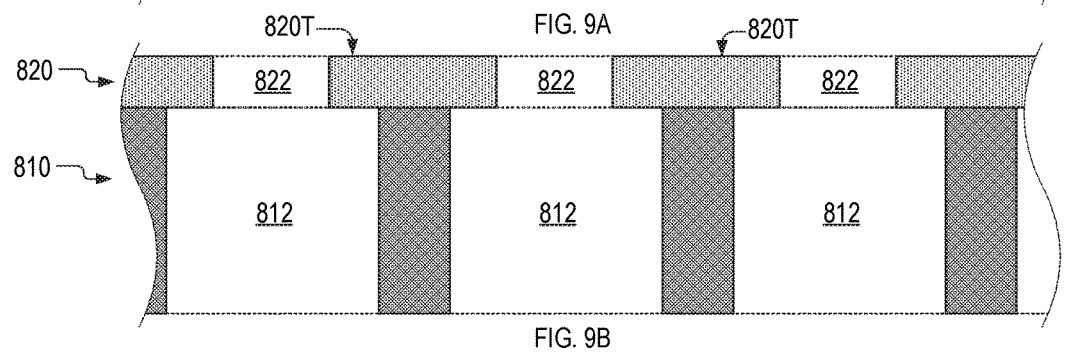
Figure 9C:
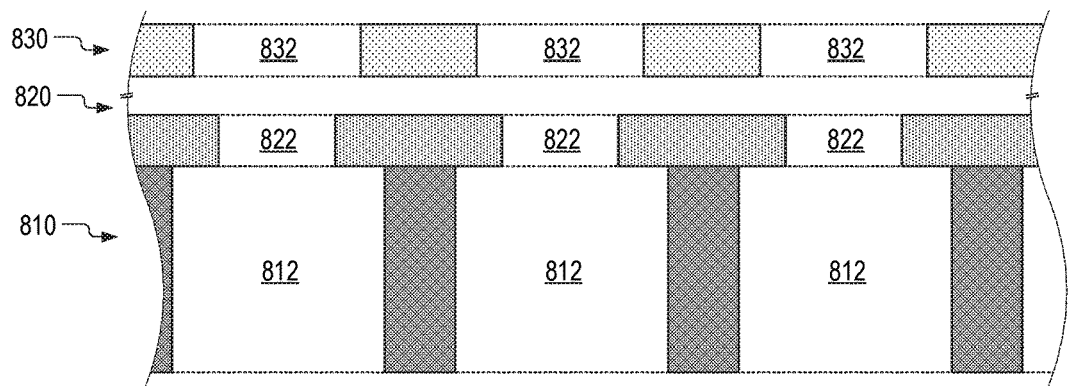
Figure 9D:
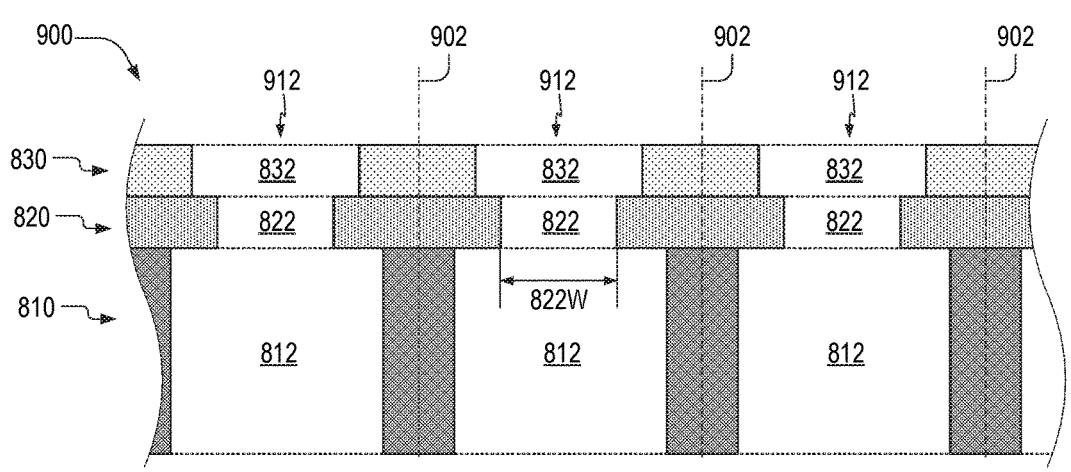
Figure 10:
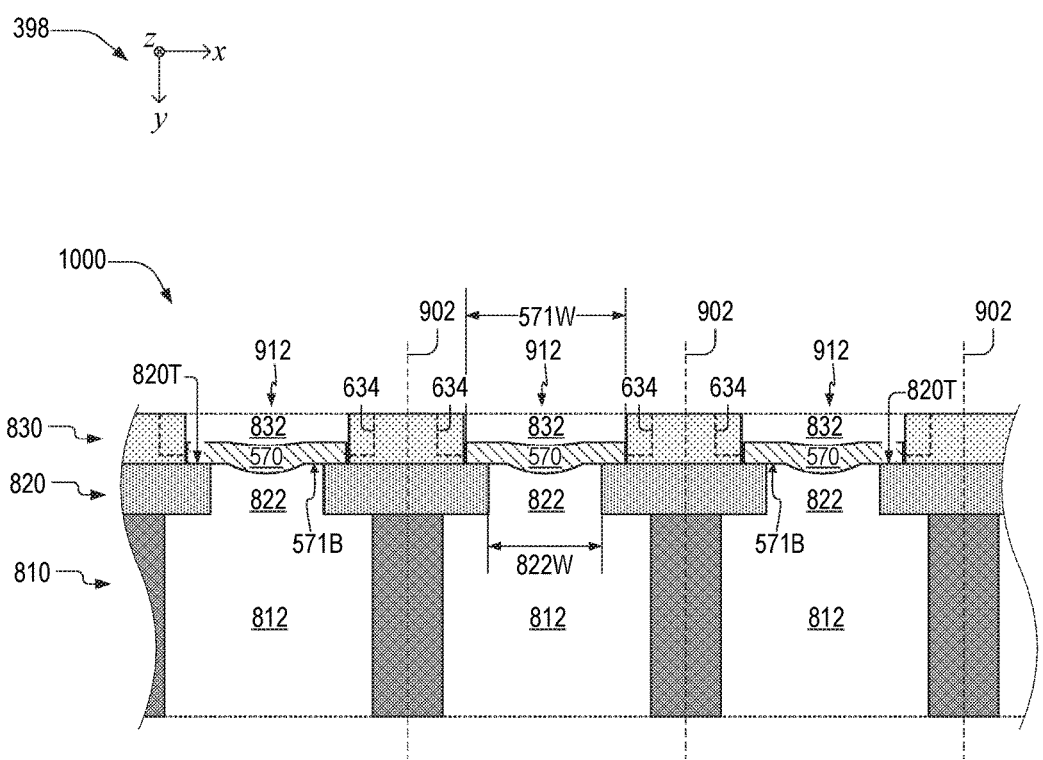
FIG. 10 is a cross-sectional view of a barreled-lens wafer resulting from the method of FIG. 7, in an embodiment.

FIG. 7 is a flowchart illustrating an exemplary method 700 for fabricating a lens barrel 300. FIG. 8 is a plan view and FIGS. 9-10 show cross-sectional views of apertured wafers, the views corresponding to steps of method 700. FIG. 7-9 are best viewed together in the following description.

Figure 8A:
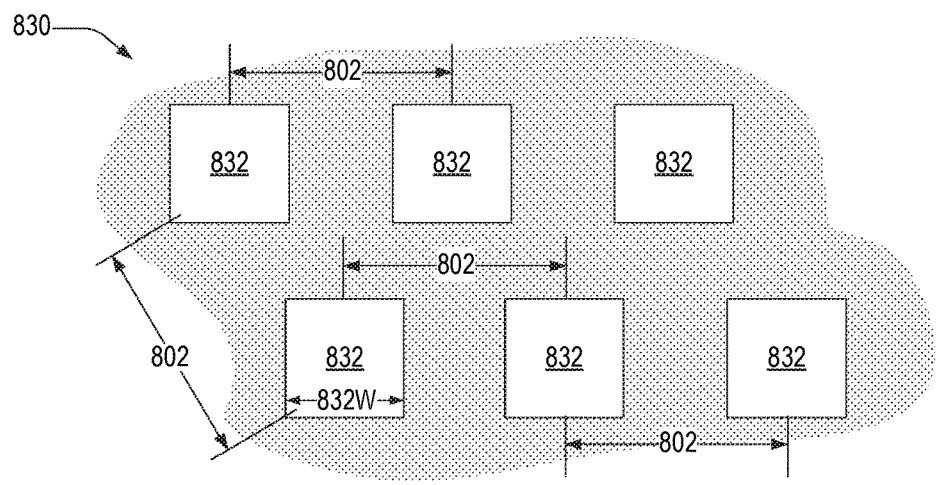
FIGS. 8A, 8B, and 8C are plan views of an upper wafer, a middle wafer, and a lower wafer, respectively, employed in the method of FIG. 7, in an embodiment.
Figure 8B:
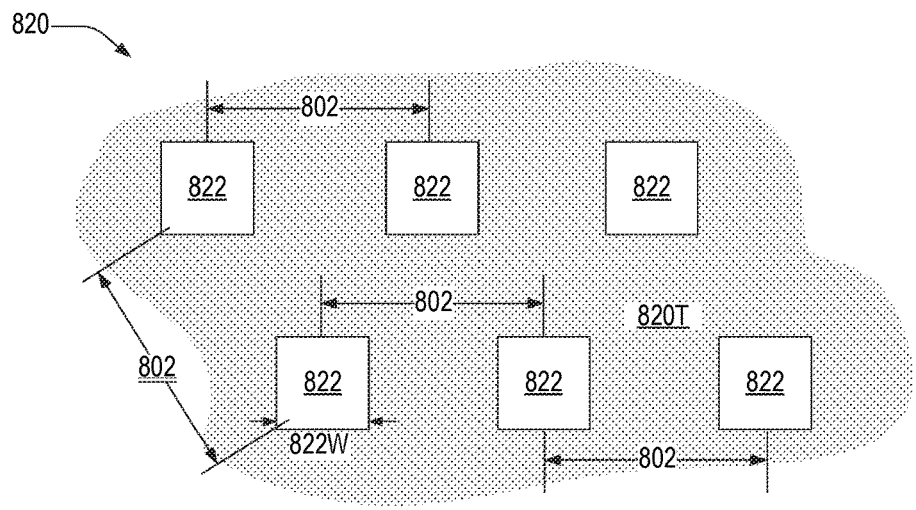
Figure 8C:
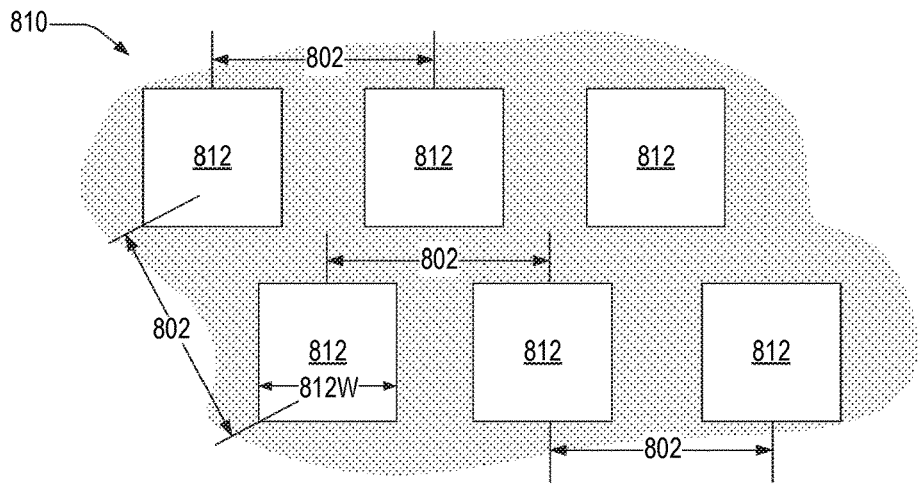

FIGS. 8A, 8B, and 8C are plan views of an upper wafer 830, a middle wafer 820, and a lower wafer 810, respectively. Lower wafer 810 has a plurality of apertures 812; middle wafer 820 has a plurality of apertures 822; upper wafer 830 has a plurality of apertures 832. Each aperture 812, 822, and 832 is an example of aperture 312, aperture 322, and aperture 332, respectively (FIG. 3). Apertures 812, 822, and 832 have respective widths 812W, 822W, and 832W. Width 832W exceeds width 822W. In each wafer 810, 820, and 830, the respective apertures therein may be periodically spaced with a center-to-center distance 802.

Method 700 may include optional step 710. In step 710, each of a plurality of middle apertures of a middle wafer are aligned to a respective one of a plurality of lower apertures of a lower wafer. FIG. 9A is a cross-sectional view of wafers 810, 820, and 830 that includes respective apertures 812, 822, and 832 therein. Middle wafer 820 has a top surface 820T. In an example of step 710, each aperture 822 of middle wafer 820 is aligned to a respective aperture 812 of lower wafer 810, as FIG. 9A illustrates.

Method 700 may also include optional step 715. In step 715, the middle wafer is attached to the lower wafer while maintaining alignment of each middle aperture to a respective lower aperture. In an example of step 715, middle wafer 820 is attached to lower wafer 810, as FIG. 9B illustrates.

When method 700 does not include steps 710 and 715, the middle wafer and the lower wafer may be monolithic. For example, wafers 810 and 820 may be a single wafer where each pair of co-aligned apertures 812 and 822 are part of a single aperture having non-uniform width across the single wafer.

In step 720, each of a plurality of upper apertures of an upper wafer are aligned to (i) a respective one of a plurality of middle apertures of a middle wafer and (ii) a respective one of a plurality of lower apertures of a lower wafer. The middle wafer is between the lower wafer and the upper wafer. In an example of step 720, each aperture 832 of upper wafer 830 is aligned to a respective aperture 822, of middle wafer 820, as FIG. 9C illustrates. Each aperture 822 is aligned with a respective aperture 812 of lower wafer 810.

In step 730, the middle wafer is bonded to the upper wafer to form a lens barrel wafer. Each triad of co-aligned upper, middle, and lower apertures forms a wafer aperture spanning between a top surface of the upper wafer and a bottom surface of the lower wafer. Each of the upper apertures has an upper width. Each of the middle apertures has a middle width that is less than the upper width to form, in each triad, a ledge for supporting a lens placed in the upper aperture. In an example of step 730, middle wafer 820 is bonded to upper wafer 830 while maintaining alignment of each aperture 822, respective aperture 812, and respective aperture 832, which results in a lens-barrel wafer 900 illustrated in FIG. 9D.

Lens-barrel wafer 900 includes a plurality of wafer apertures 912 each formed by an aperture 822 co-aligned with an aperture 812 and 832. Each wafer aperture 912 has a respective middle width corresponding to a minimum width of the aperture 822 thereof. For example, aperture 822 has minimum width 822W such that each wafer aperture 912 has a middle width 822W.

Method 700 optionally includes step 740. In step 740, a lens is disposed on the ledge of each wafer aperture to form a lens-barrel wafer, in which each lens has a flange width that exceeds the middle width. In an example of step 740, each one of a plurality of lenses 570 is disposed onto surface 820T of a respective one of a plurality of wafer apertures 912 to form a barreled-lens wafer 1000, as shown in FIG. 10. Barreled-lens wafer 1000 includes lens-barrel wafer 900 and a plurality of lenses 570. For any wafer aperture 912, middle width 822W is less than flange width 571W of the lens 570 in the wafer aperture.

Step 740 may include step 742, in which each lens is bonded onto a surface of the middle wafer within the lens's respective aperture. In an example of step 742, each lens 570 is bonded, via its bonding surface 571B, to surface 820T of its respective wafer aperture 912. Regions of wafer 830 surrounding each aperture 832 may resemble layer 630 (FIG. 6) by having therein a plurality of notches 634 adjoining aperture 832. FIG. 10 illustrates optional notches 634 as dashed lines. Step 742 may include dispensing an adhesive onto surfaces 820T via notches 634.

Method 700 optionally includes step 750. In step 750, the lens-barrel wafer is singulated to form a plurality of lens barrels. In an example of step 750, lens-barrel wafer 900 is singulated along dicing planes 902 to form a plurality of lens barrels 300. Each dicing plane 902 is in a plane parallel to the y-z plane. In a second example of step 750, barreled-lens wafer 1000 is singulated along dicing planes 902 to form a plurality of barreled lenses 505.

Method 700 optionally includes step 760. In step 760, one of the plurality of lens barrels is attached to an image sensor such that the lower aperture spans the image sensor's pixel array. In an example of step 760, lens barrel 300 is attached to image sensor 102 such that width 312W of lower aperture 312 spans pixel array 104.

Combinations of Features

Features described above as well as those claimed below may be combined in various ways without departing from the scope hereof. The following examples illustrate some possible, non-limiting combinations:

(A1) A lens barrel includes an annular lower layer, an annular upper layer, and an annular middle layer. The annular lower layer defines a lower aperture therethrough. The annular upper layer defines an upper aperture therethrough having an upper width. The annular middle layer is bonded between the lower layer and the upper layer and defines a middle aperture having a middle width that is less than the upper width to form a ledge for supporting a lens disposed in the upper aperture. The lower aperture, the middle aperture, and the upper aperture collectively form at least part of a barrel aperture through the lower, middle, and upper layers.

(A2) In the lens barrel denoted by (A1), the middle width may be less than the lower width.

(A3) In a lens barrel denoted by one of (A1) and (A2), the upper width may be less than the lower width.

(A4) Any lens barrel denoted by one of (A1) through (A3) may further include a notch in the top surface of the upper layer extending to a depth from the top surface that is less than a maximum thickness of the upper layer and adjoining the upper aperture to facilitate adhesive dispensation in the notch for bonding the lens to the at least one of the upper and middle layers.

(A5) Any lens barrel denoted by one of (A1) through (A4) may further include, in the upper aperture, a lens having a flange resting on the ledge (A6) In the lens barrel denoted by (A5), the lens may further include a non-planar surface at least partially within the middle aperture.

(B1) A lens-barrel wafer includes a lower wafer, a middle wafer, and an upper wafer. The lower wafer includes a plurality of lower apertures each having a respective lower width and spanning between a bottom surface and a top surface of the lower wafer. The upper wafer includes a plurality of upper apertures each having a respective upper width and spanning between a bottom surface and a top surface of the upper wafer. The middle wafer is bonded between the top surface of the lower wafer and the bottom surface of the upper wafer. The middle wafer includes a plurality of middle apertures each aligned with a respective one of the plurality of lower apertures and a respective one of the plurality of upper apertures. Each middle aperture, a lower aperture aligned thereto, and an upper aperture aligned thereto form a wafer aperture spanning between the bottom surface of the lower wafer and the top surface of the upper wafer. Each middle aperture has a width less than a width of the upper aperture aligned thereto, to form a ledge for supporting a lens placed in the upper aperture aligned thereto.

(B2) In the lens-barrel wafer denoted by (B1), the middle width of each middle aperture may be less than the lower width of the lower aperture aligned thereto.

(B3) In a lens-barrel wafer denoted by one of (B1) and (B2), the upper width may be less than the lower width.

(B4) Any lens-barrel wafer denoted by one of (B1) through (B3), may further include, in each upper aperture, a lens having a flange resting on the ledge.

(C1) A method for forming a lens barrel includes an aligning step and a bonding step. In the aligning step, the method aligns each of a plurality of upper apertures of an upper wafer to (i) a respective one of a plurality of middle apertures of a middle wafer and (ii) a respective one of a plurality of lower apertures of a lower wafer. The middle wafer is between the upper wafer and the lower wafer. In the bonding step, the method bonds the middle wafer to the upper wafer to form a lens barrel wafer. Each triad of co-aligned upper, middle, and lower apertures forms a wafer aperture spanning between a top surface of the upper wafer and a bottom surface of the lower wafer. Each of the upper apertures has a respective upper width and each of the middle apertures has a respective middle width that is less than the respective upper width to form, in each triad, a ledge for supporting a lens in the upper aperture.

(C2) The method denoted by (C1) may further include singulating the lens-barrel wafer to form a plurality of lens barrels.

(C3) A method denoted by one of (C1) and (C2) may further include disposing a lens on the ledge of each wafer aperture to form a barreled-lens wafer.

(C4) The method denoted by (C3) may further include singulating the lens-barrel wafer to form a plurality of barrel-mounted lenses.

(C5) Any method denoted by one of (C1) through (C4) may further include, before the step of aligning each of a plurality of upper apertures, aligning each of the plurality of middle apertures of a middle wafer to a respective one of the plurality of lower apertures of the lower wafer.

(C6) The method denoted by (C5) may further include attaching the middle wafer to the lower wafer while maintaining alignment of each middle aperture to a respective lower aperture.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A lens barrel comprising:
   an annular lower layer defining a lower aperture therethrough;
   an annular upper layer defining an upper aperture therethrough having an upper width;
   an annular middle layer, bonded between the lower layer and the upper layer, and defining a middle aperture having a middle width that is less than the upper width to form a ledge, the lower aperture, the middle aperture, and the upper aperture collectively forming at least part of a barrel aperture through the lower, middle, and upper layers;
   a lens positioned on the ledge in the upper aperture;
   a cap layer including a bottom surface, a first region thereof attached to a top surface of the annular upper layer, and a second region thereof extending over the upper aperture directly above the ledge; and
   a securing layer spanning a region between the cap layer and a top surface of the lens, the cap layer and the securing layer cooperating to secure the lens within the upper aperture.

2. The lens barrel of claim 1, the middle width being less than a lower width of the lower aperture.

3. The lens barrel of claim 1, the upper width being less than a lower width of the lower aperture.

4. The lens barrel of claim 1, further comprising the upper layer forming a notch in the top surface thereof of the upper layer extending to a depth from the top surface that is less than a maximum thickness of the upper layer and adjoining the upper aperture to facilitate adhesive dispensation in the notch for bonding the lens to the at least one of the upper and middle layers, the notch (i) adjoining the upper aperture, (ii) having a depth extending from the top surface to a non-zero distance from the ledge, and (iii) creating a gap between the lens and an outer edge of the notch spanning the depth.

5. The lens barrel of claim 1, the lens having a flange resting on the ledge.

6. The lens barrel of claim 5, the lens further comprising a non-planar surface at least partially within the middle aperture.

7. The lens barrel of claim 1, a top surface of the annular middle layer being bonded to a top surface of the lower layer, at least one of the top surface of the lower layer, the top surface of the annular middle layer, and the top surface of the annular upper layer being a planar surface.

8. A lens-barrel wafer comprising:
   a lower wafer including a plurality of lower apertures each having a respective lower width and spanning between a bottom surface and a top surface of the lower wafer;
   an upper wafer including a plurality of upper apertures each having a respective upper width and spanning between a bottom surface and a top surface of the upper wafer;
   a middle wafer, bonded between the top surface of the lower wafer and the bottom surface of the upper wafer, and including a plurality of middle apertures each aligned with a respective one of the plurality of lower apertures and a respective one of the plurality of upper apertures, wherein each middle aperture, a lower aperture aligned thereto, and an upper aperture aligned thereto forms a wafer aperture spanning between the bottom surface of the lower wafer and the top surface of the upper wafer, and each middle aperture has a respective width less than the respective upper width of the upper aperture aligned thereto, to form a ledge;
   a plurality of lenses, each lens placed on a top surface of the ledge,
   the upper wafer forming a plurality of notches in a top surface of the upper wafer to facilitate adhesive dispensation in each notch for bonding a respective one of the lenses, when placed on the top surface of the respective ledge, to at least one of the middle wafer and the upper wafer, each of the notches (i) adjoining a respective one of the upper apertures, (ii) having a depth extending from the top surface to a non-zero distance from the top surface of the respective ledge and (iii) creating a gap between the respective one of the lenses and an outer edge of the notch spanning the depth.

9. The lens-barrel wafer of claim 8, the middle width of each middle aperture being less than the lower width of the lower aperture aligned thereto.

10. The lens-barrel wafer of claim 8, the upper width being less than the lower width.

11. The lens-barrel wafer of claim 8, further comprising, in each upper aperture, a lens having a flange resting on the ledge.

12. A method for forming a lens barrel comprising:
aligning each of a plurality of upper apertures of an upper wafer to (i) a respective one of a plurality of middle apertures of a middle wafer and (ii) a respective one of a plurality of lower apertures of a lower wafer, the middle wafer being between the upper wafer and the lower wafer;
bonding the middle wafer to the upper wafer to form a lens barrel wafer, each triad of co-aligned upper, middle, and lower apertures forming a wafer aperture spanning between a top surface of the upper wafer and a bottom surface of the lower wafer, each of the upper apertures having a respective upper width and each of the middle apertures having a respective middle width that is less than the respective upper width to form, in each triad, a ledge for supporting a lens in the upper aperture;
dispending adhesive in each of a plurality of notches in a top surface of the upper wafer, each of the notches (i) adjoining a respective one of the upper apertures, (ii) having a depth extending from the top surface to a non-zero distance from the top surface of the ledge, and (iii) creating a gap between the lens and an outer edge of the notch spanning the depth; and
in each triad, disposing a respective lens on a top surface of the ledge, to adhere the lens to at least one of the upper wafer and the middle wafer via the adhesive, so as to form a lens-barrel wafer.

13. The method of claim 12, further comprising singulating the lens-barrel wafer to form a plurality of lens barrels.

14. The method of claim 12, further comprising singulating the lens-barrel wafer to form a plurality of barrel-mounted lenses.

15. The method of claim 12, further comprising, before the step of aligning each of a plurality of upper apertures:
aligning each of the plurality of middle apertures of the middle wafer to a respective one of the plurality of lower apertures of the lower wafer.

16. The method of claim 15, further comprising bonding the middle wafer to the lower wafer while maintaining alignment of each middle aperture to a respective lower aperture.

* * * * *